Figure 1:
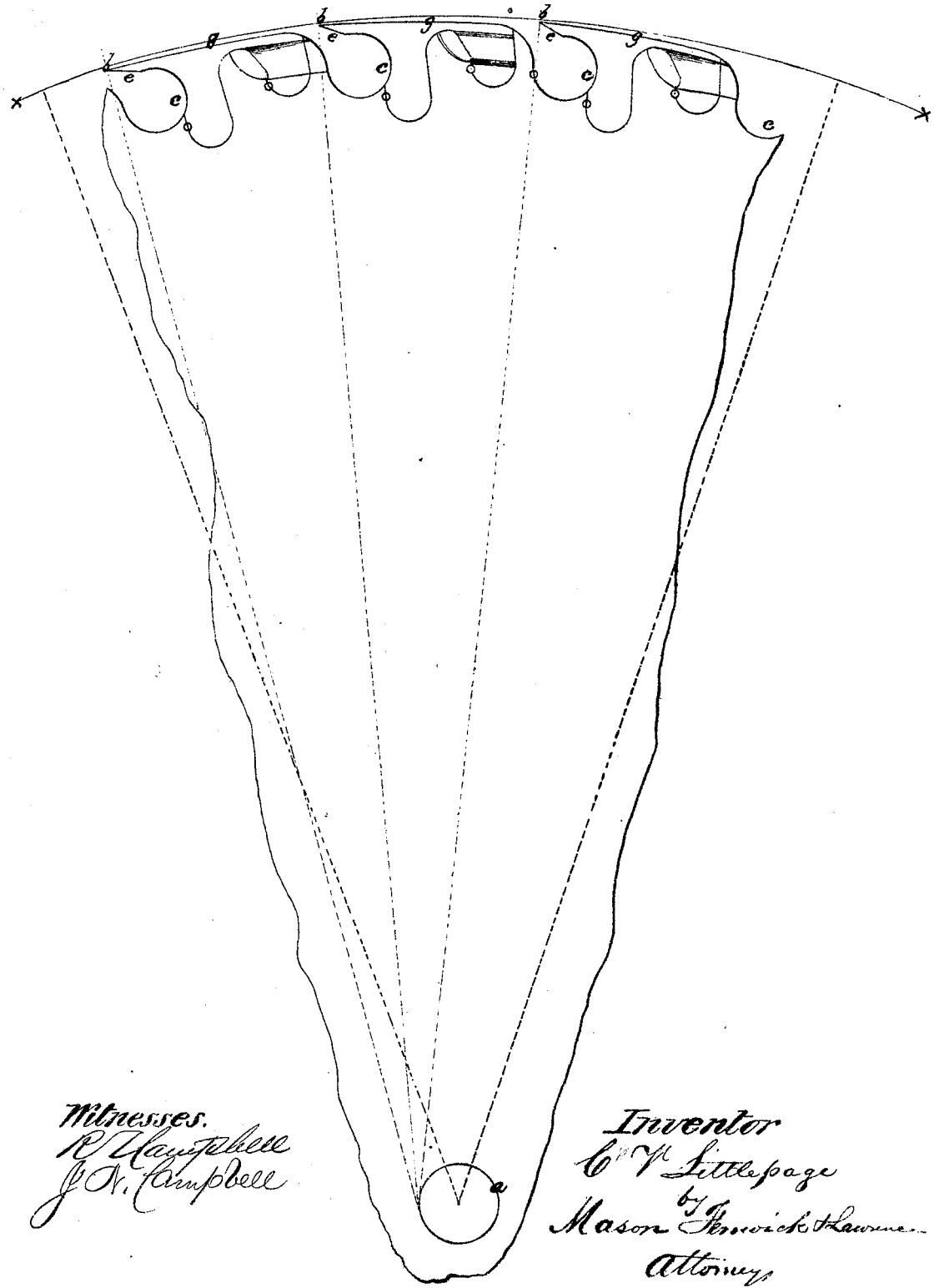

CALEB V. LITTLEPAGE.
Improvement in Method of Forming Saw Teeth.
No. 121,951. Patented Dec. 19, 1871.

CALEB V. LITTLEPAGE.
Improvement in Method of Forming Saw Teeth.
No. 121,951.   Patented Dec. 19, 1871.
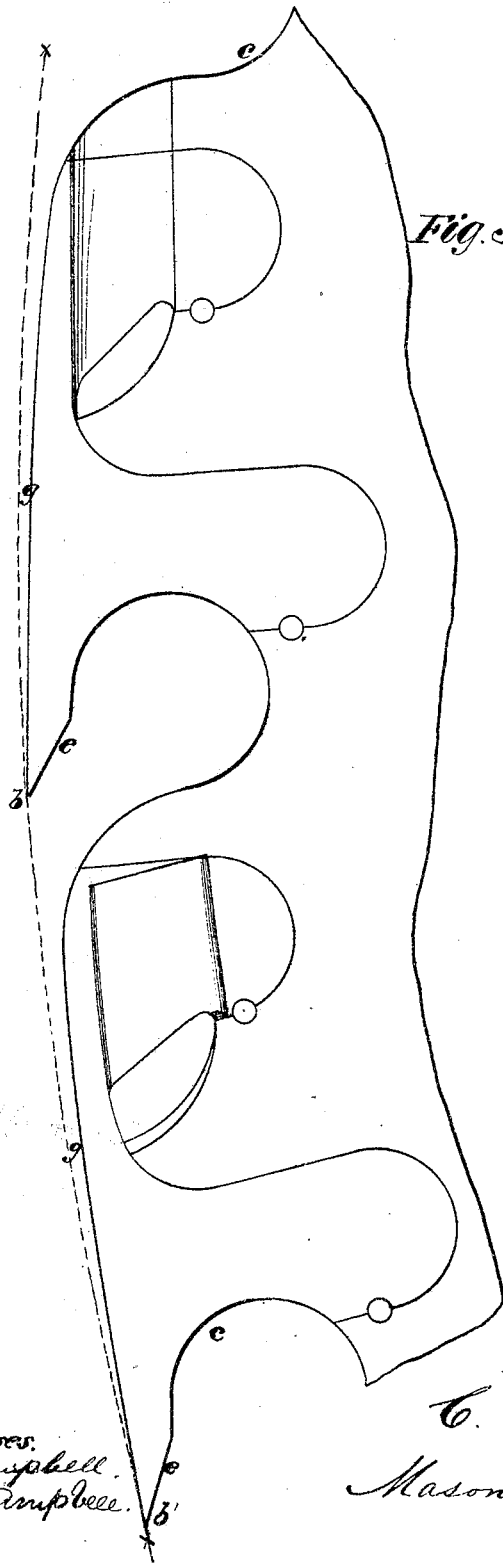
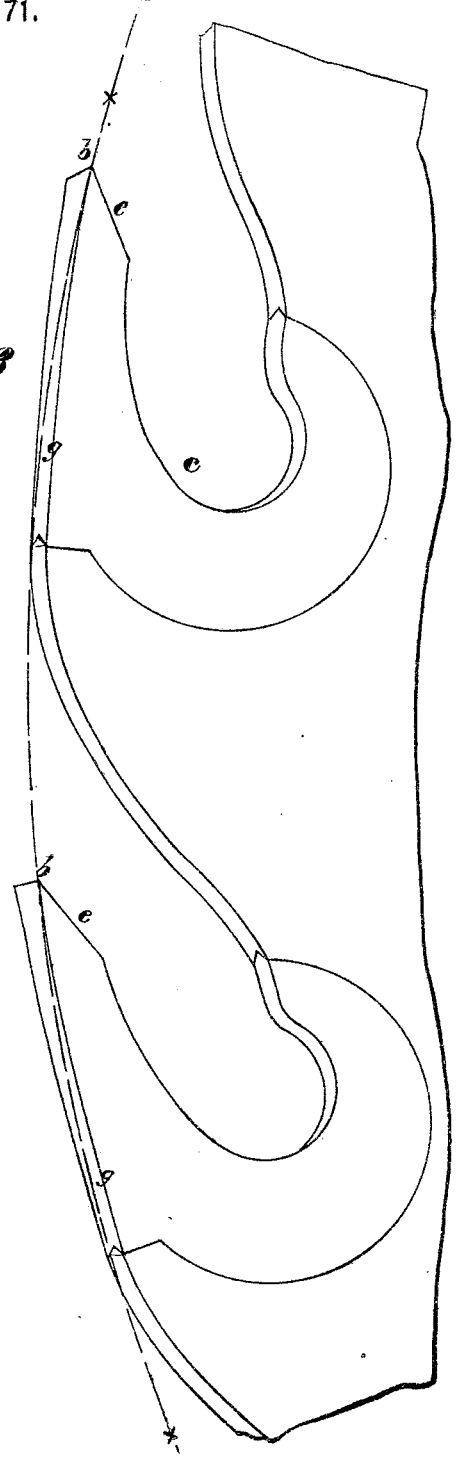

UNITED STATES PATENT OFFICE.

CALEB V. LITTLEPAGE, OF AUSTIN, TEXAS.

IMPROVEMENT IN METHODS OF FORMING SAW-TEETH.

Specification forming part of Letters Patent No. 121,951, dated December 19, 1871.

*To all whom it may concern:*

Be it known that I, CALEB V. LITTLEPAGE, of Austin, in the county of Travis and State of Texas, have invented a new and Improved Mode of Forming Saw-Teeth; and I do hereby declare that the following is a full, clear, and exact description thereof, reference being had to the accompanying drawing making part of this specification, in which—

Figure 1, Plate 1, is a diagram illustrating the mode of forming the teeth. Fig. 2, Plate 2, is an enlarged view of two teeth. Fig. 3, Plate 2, shows two well-known teeth shaped according to my invention.

This invention relates to a rule for giving to the backs of saw-teeth such an angle as will allow the teeth to be made of proper strength and at the same time to be chambered out and pointed so that they will cut the wood like chisels instead of scraping or tearing the wood, as will be hereinafter explained.

The following description of my invention will enable others skilled in the art to understand it.

In the accompanying drawing, Figs. 1 and 2, I have represented my invention applied to gullet-teeth having planing-cutters formed on them, as described in the application for Letters Patent marked A and bearing even date with the filing of this; but it will be hereinafter shown that the invention is also applicable to the teeth shown in Fig. 3, as well as to many other kinds of saw-teeth.

RULE.—Having determined the amount of cut required at each revolution of the saw-blade, I divide this amount into four equal parts, and, with a pair of compasses, I describe a circle, $a$, on the saw-blade concentric to the axis, whose diameter is exactly equal to two of said parts, or one-half the cut of the saw at each revolution. I then divide off the periphery of the saw according to the number of teeth required, and, with one leg of the compass touching the circle $a$ and the other leg a point, $b$, corresponding to the point of a tooth, I draw the back of a tooth. In this way the back of each tooth is determined and laid down upon the blade or pattern.

Suppose it is desired to make a saw the diameter of which is sixty inches, and it is desired to have it cut four inches at every revolution: As one inch is one-fourth of the full cut, I describe a circle concentric to the axis of the saw-blade two inches in diameter, which gives one inch eccentricity all around. The points $b$ for the teeth are then marked off on the circumference of the blade, after which the proper lines $g$ for the backs of the teeth are found, as above described.

This rule applies to any desired diameter of saw, it only being necessary to give the amount of cut at each revolution and divide this amount into fourths for eccentricity.

By observing this rule I have all the clearance required back of the point of a tooth, and do not remove any more metal from the backs of the teeth than is absolutely necessary for such clearance. This being the case, I am enabled to produce the point of each tooth by beveling from the gullet $c$ outwardly to the periphery of the blade; or, in other words, to a point which is intersected by a circle which is concentric to the axis of the blade, and which represents the greatest diameter thereof. This bevel will then be tangent to a circle of great diameter, so that the points of the teeth will be presented to the wood in sawing in an almost direct manner, so as to cut the wood rather than scrape it away.

It is obvious that if more metal would have to be left on that edge next the gullet $c$, the bevel $e$, which gives the point $b$, would have to be more obtuse to the circumferential line $x\ x$ to obtain the required strength, and the effect would be that the tooth would scrape the wood instead of cut it. This scraping action is increased inversely as the angle $g$ increases, but by observing the rule herein laid down the least possible angle is obtained for the back of the tooth, which will allow the proper clearance, and the degree of bevel or obliquity $e$ which forms the point $b$ is arbitrary and left to the judgment of the sawyer, who can have it more or less acute, according to the softness of the wood to be sawed.

Having described my invention, what I claim is—

Saw-teeth produced according to the rule herein laid down.

CALEB V. LITTLEPAGE.

Witnesses:
 Z. N. CAMPBELL,
 EDM. F. BROWN.

(131)